(12) United States Patent
Huang

(10) Patent No.: US 9,302,328 B2
(45) Date of Patent: Apr. 5, 2016

(54) UPRIGHT CHUCK ASSEMBLY

(71) Applicant: VERTEX MACHINERY WORKS CO., LTD., Taichung (TW)

(72) Inventor: Han-Nung Huang, Taichung (TW)

(73) Assignee: Vertex Machinery Works Co., Ltd., Taichung (TW)

( * ) Notice: Subject to any disclaimer, the term of this patent is extended or adjusted under 35 U.S.C. 154(b) by 184 days.

(21) Appl. No.: 14/090,140

(22) Filed: Nov. 26, 2013

(65) Prior Publication Data

US 2014/0291941 A1 Oct. 2, 2014

(30) Foreign Application Priority Data

Mar. 27, 2013 (TW) .............................. 102205628 U
Nov. 6, 2013 (TW) .............................. 102220672 U

(51) Int. Cl.
*B23B 31/163* (2006.01)
*B23B 31/16* (2006.01)
*B23B 31/24* (2006.01)

(52) U.S. Cl.
CPC ..... *B23B 31/16083* (2013.01); *B23B 31/16004* (2013.01); *B23B 31/24* (2013.01); *B23B 2231/00* (2013.01); *B23B 2260/07* (2013.01); *Y10T 279/17* (2015.01); *Y10T 279/1933* (2015.01)

(58) Field of Classification Search
CPC .................. B23B 31/16004; B23B 31/16083; B23B 31/24; B23B 2260/07
USPC .................................................. 279/114–116
See application file for complete search history.

(56) References Cited

U.S. PATENT DOCUMENTS

| | | | | | |
|---|---|---|---|---|---|
| 1,007,132 | A | * | 10/1911 | Miller | B23B 31/16004 279/116 |
| 1,831,225 | A | * | 11/1931 | Bogart | B23B 31/28 279/114 |
| 1,909,658 | A | * | 5/1933 | Casler | B23B 31/28 279/114 |
| 2,528,442 | A | * | 10/1950 | Leifer | B23B 31/28 279/114 |
| 2,529,772 | A | * | 11/1950 | Highberg | B23B 31/28 279/116 |
| 2,567,498 | A | * | 9/1951 | Strauss | B23B 31/36 279/116 |
| 2,579,796 | A | * | 12/1951 | Church | B23B 31/28 279/114 |
| 4,524,983 | A | * | 6/1985 | Burnham | B23B 31/1605 279/110 |

FOREIGN PATENT DOCUMENTS

JP 03117505 A * 5/1991

* cited by examiner

*Primary Examiner* — Eric A Gates
(74) *Attorney, Agent, or Firm* — Rosenberg, Klein & Lee

(57) ABSTRACT

An upright chuck assembly includes a base having two elongate notches respectively defined in two sides thereof. A rotary device is connected to the base and includes a horizontal gear set and a vertical gear set which are engaged with the horizontal gear set in the body of the rotary device. An insertion extends from the horizontal gear set and is inserted into one of the adjustable members. The vertical gear set has a connection portion on the top thereof, and a T-wrench is mounted to the connection portion. The rotary device is cooperated with a vertical machine center.

3 Claims, 11 Drawing Sheets

UPRIGHT CHUCK ASSEMBLY

BACKGROUND OF THE INVENTION

1. Fields of the invention

The present invention relates to a chuck assembly, and more particularly, to an upright chuck assembly.

2. Descriptions of Related Art

The conventional chuck assembly is used on a machine center which can be a horizontal machine center or a vertical machine center. Each of the two types of machine center has a chuck assembly. Vise is usually cooperated with a milling machine, drilling machine. Chuck is usually cooperated with a lathe.

As shown in FIG. 11 which shows the China Patent No. CN202741779U and discloses a chuck assembly 9 which has a chuck unit 91 with three pawls 911 on a work bench 94, and multiple blocks 92 fix the chuck unit 91 on the work bench 94. The three pawls 911 automatically position a cylindrical object at the center of the chuck assembly so as to be machined conveniently.

When the three pawls 911 are released from the object, a T-wrench 93 has to be inserted into an adjustment member 912 and rotated. However, the T-wrench 93 is located horizontally and the handle of the T-wrench 93 will be interfered with the work bench 94 so that the T-wrench 93 cannot be rotated 360 degrees. This is not convenient for the user to operate the T-wrench 93.

The present invention intends to provide an upright chuck assembly which is easily and conveniently operated. Besides, the present invention can be used to upright machine centers of different sizes.

SUMMARY OF THE INVENTION

The present invention relates to an upright chuck assembly and comprises a chuck unit having a passage and multiple adjustment members. The chuck unit has multiple connection holes. A base has a central hole, and two elongate notches are respectively defined in two sides of the base. Multiple first holes are defined in the base and located beside the central hole. Multiple bolts extend through the first holes to connect the base to the chuck unit. A rotary device has a body, a horizontal gear set and a vertical gear set. The horizontal gear set and the vertical gear set are engaged with each other in the body. An insertion extends from the horizontal gear set and is inserted into one of the adjustable members to connect the horizontal gear set to the base. The vertical gear set has a connection portion on the top thereof. A T-wrench is mounted to the connection portion.

Preferably, the rotary device has an extension extending therefrom and the extension is connected to second holes defined in one side of the base by extending multiple bolts through holes in the extension. Each of the through holes is an oval hole and the bolts are adjustable in the through holes.

The present invention has advantages, wherein the insertion of the horizontal gear set is inserted into one of the adjustable members, and the T-wrench is mounted to the connection portion connection portion on the top of the vertical gear set to control the operation of the chuck unit relative to the object. The chuck unit can be cooperated with existed base, rotary device and extension to easily install the chuck deice to the vertical machine center at very low cost.

Besides, the through holes of the extension each are oval holes so that the rotary device can be adjustably connected with chuck devices of different brands.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
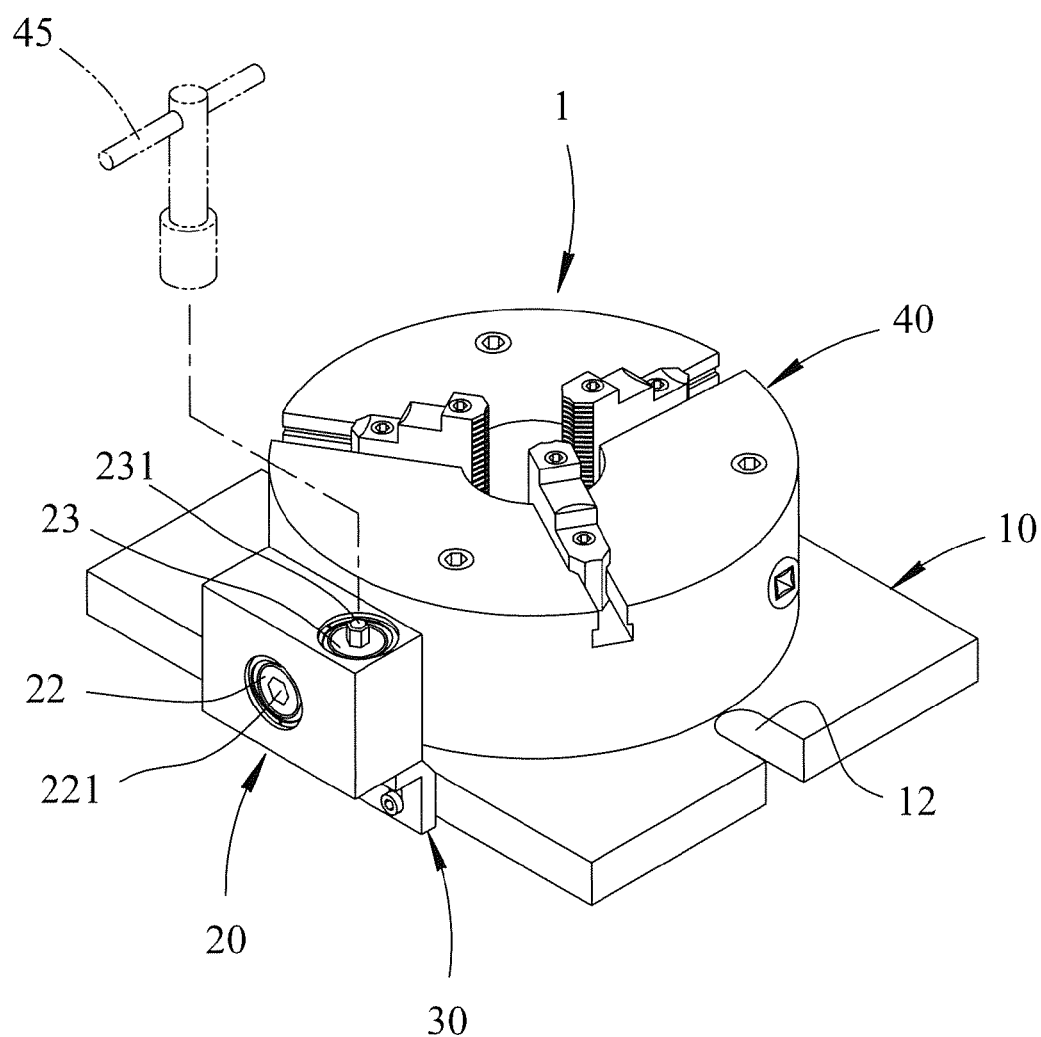
FIG. 1 is a perspective view to show the chuck assembly the of the present invention.

Referring to FIGS. 1 to 6, the chuck assembly 1 of the present invention comprises a base 10, a rotary device 20, an extension 30 and a chuck unit 40.

The base 10 has a central hole 11 so that debris during machining drop to the work bench 5 via the central hole 11. Two elongate notches 12 are respectively defined in two sides of the base 10 and two bolts extend through the notches 12 to fix the chuck assembly 10 to the work bench 5. Multiple first holes 13 are defined in the base 10 and located beside the central hole 11. Multiple second holes 14 are defined in one side of the base 10.

Figure 3:
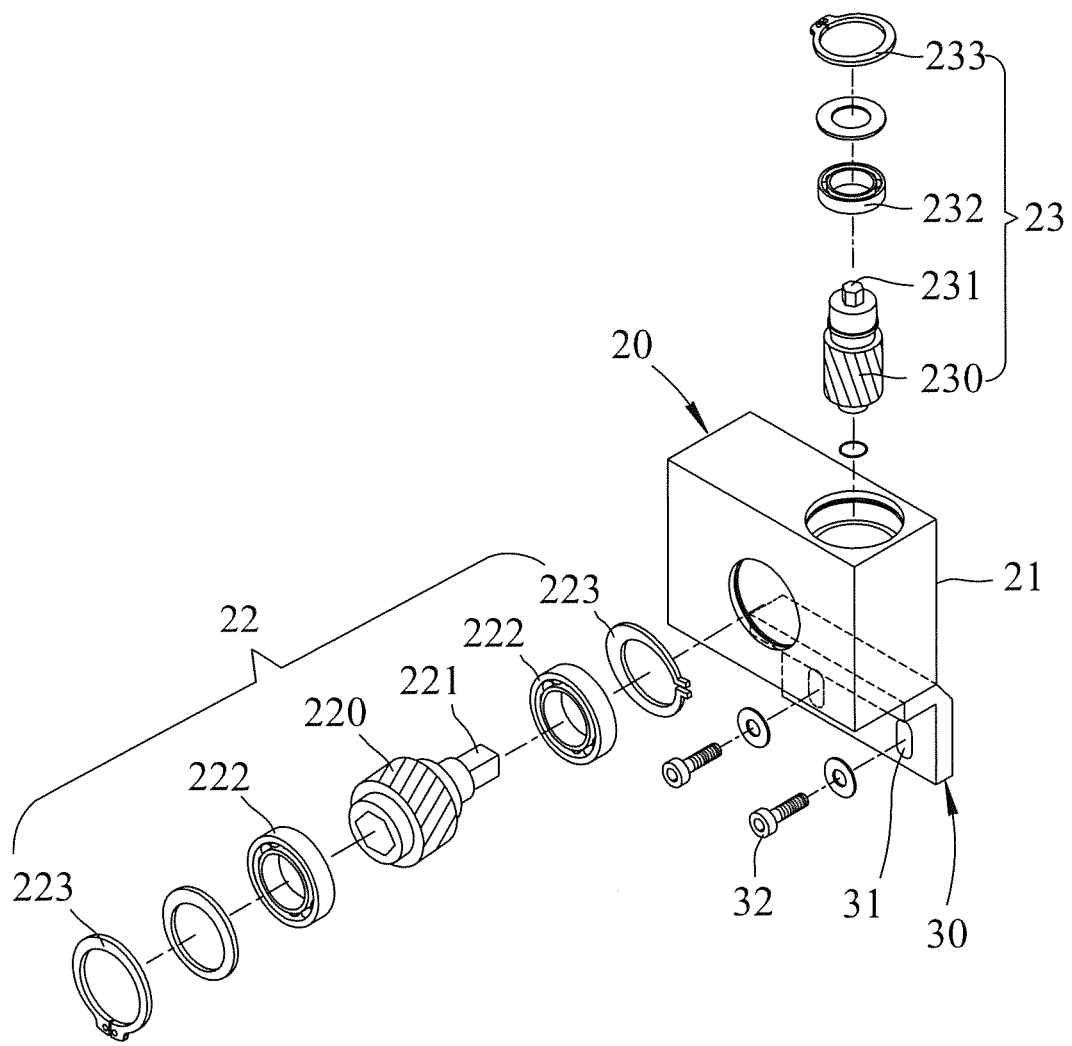
FIG. 3 is an exploded view of the rotary device of the chuck assembly of the present invention.
Figure 5:
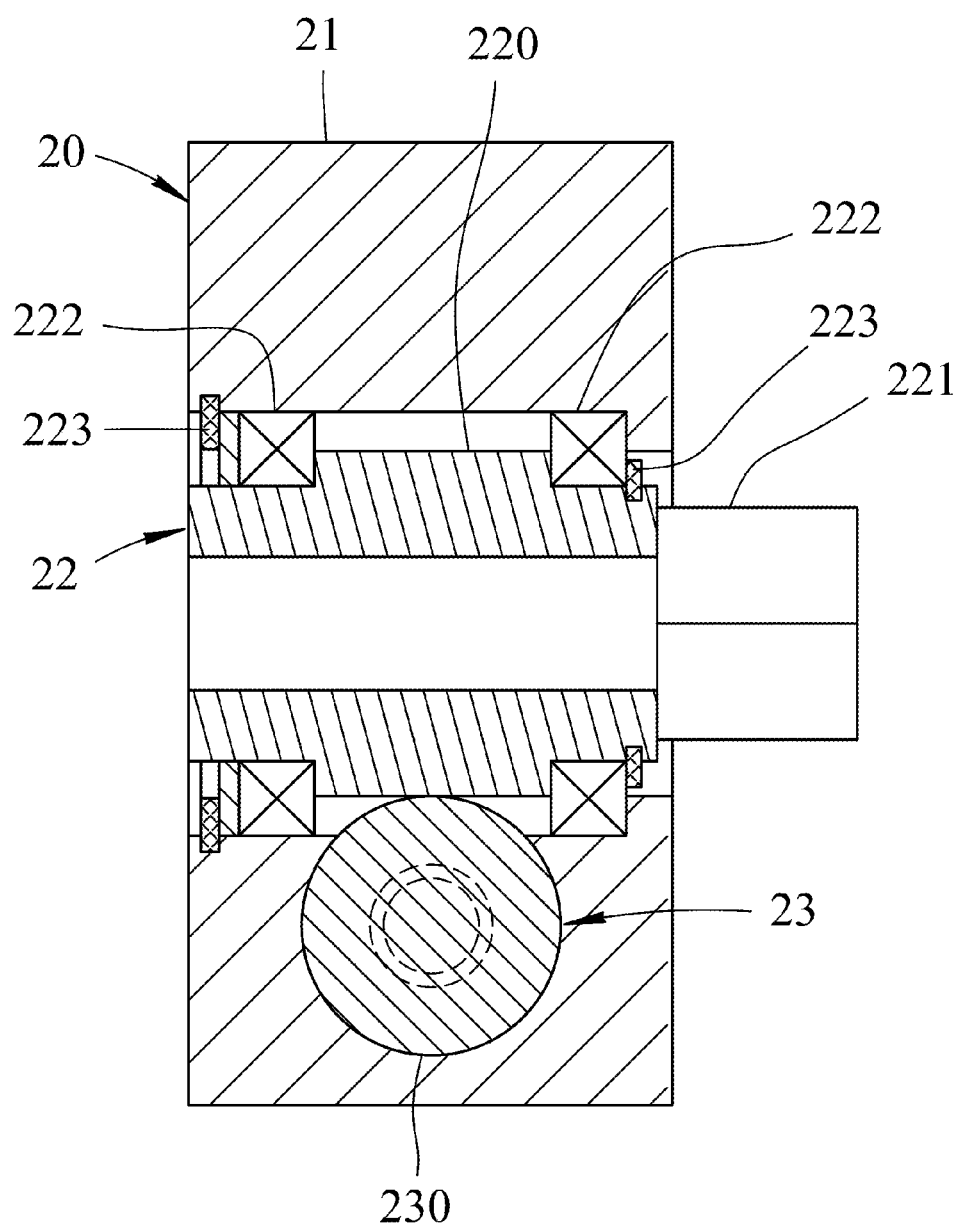
FIG. 5 is a cross sectional view of the rotary device of the chuck assembly of the present invention.

The rotary device 20 comprises a body 21, a horizontal gear set 22 and a vertical gear set 23. The horizontal gear set 22 and the vertical gear set 23 are engaged with each other in the body 21. An insertion 221 extends from the horizontal gear set 22 and is inserted into one of the adjustable members 43 to connect the horizontal gear set 22 to the base 10. The size of the insertion 221 is vary to be connected with the chuck units of different brands. The vertical gear set 23 has a connection portion 231 on the top thereof, and a T-wrench 45 is mounted to the connection portion 231. As shown in FIGS. 3 and 5, the horizontal gear set 22 has a first gear rod 220 and two bearings 222 are connected to two ends of the first gear 220. The first gear rod 220 and two bearings 222 are connected to the body 21 by using two C-clips 223. The insertion 221 of the horizontal gear set 22 can be a rectangular rod, a pentagonal rod or a hexagonal rod so as to be easily engaged with the adjustment members 43 and to rotate the adjustment members 43. The vertical gear set 23 has a second gear rod 230 and two bearings 232 are connected to two ends of the second gear 230. The second gear rod 230 and two bearings 222 are connected to the body 21 by using at least one C-clips 233. The horizontal and vertical gear sets 22, 23 are perpendicularly engaged with each other. The connection portion 231 of the vertical gear set 23 is a rectangular hole, a pentagonal hole or a hexagonal hole, or a rectangular rod, a pentagonal rods or a hexagonal rod so as to be cooperated with the T-wrench 45 to rotate the rotary device 20.

The extension 30 is connected to the lower end of the rotary device 20 and bolts 32 extend through the through holes 31 of the extension 30 to fix the extension 30 to the second holes 14 of the base 10, so as to support and fix the rotary device 20. It is noted that the through holes 31 each are oval holes and the bolts 32 are adjustable in the through holes 31.

Figure 4:
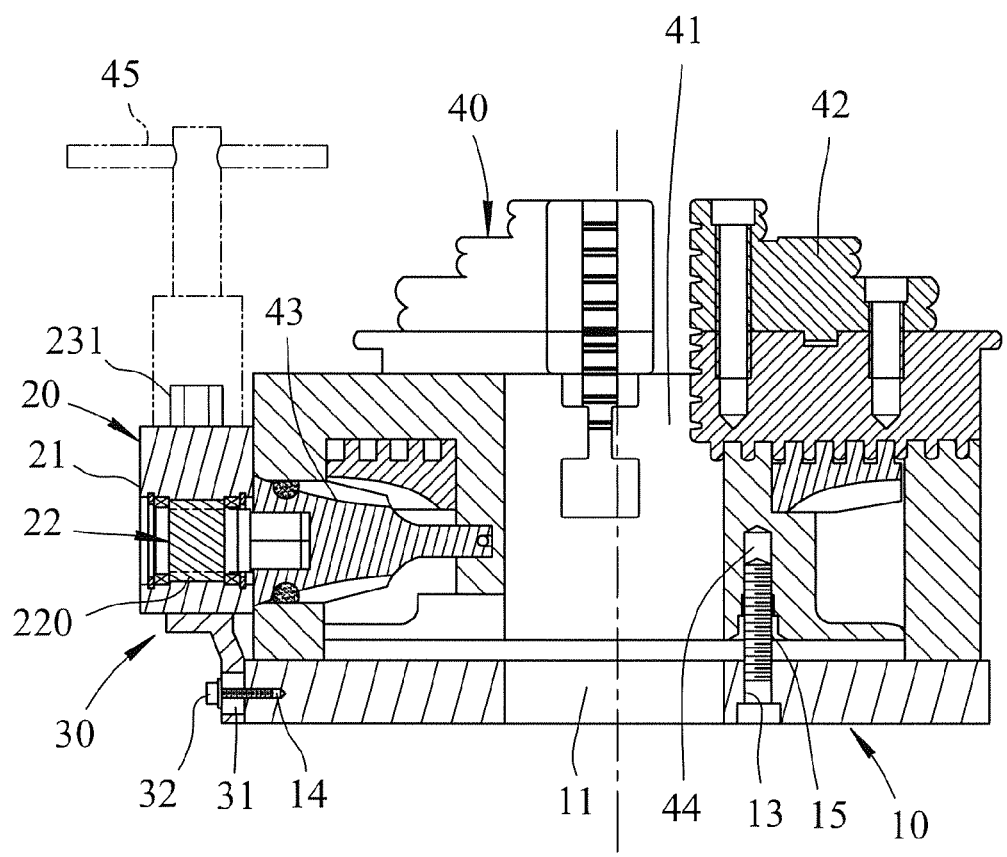
FIG. 4 is a cross sectional view of the chuck assembly of the present invention.
Figure 6:
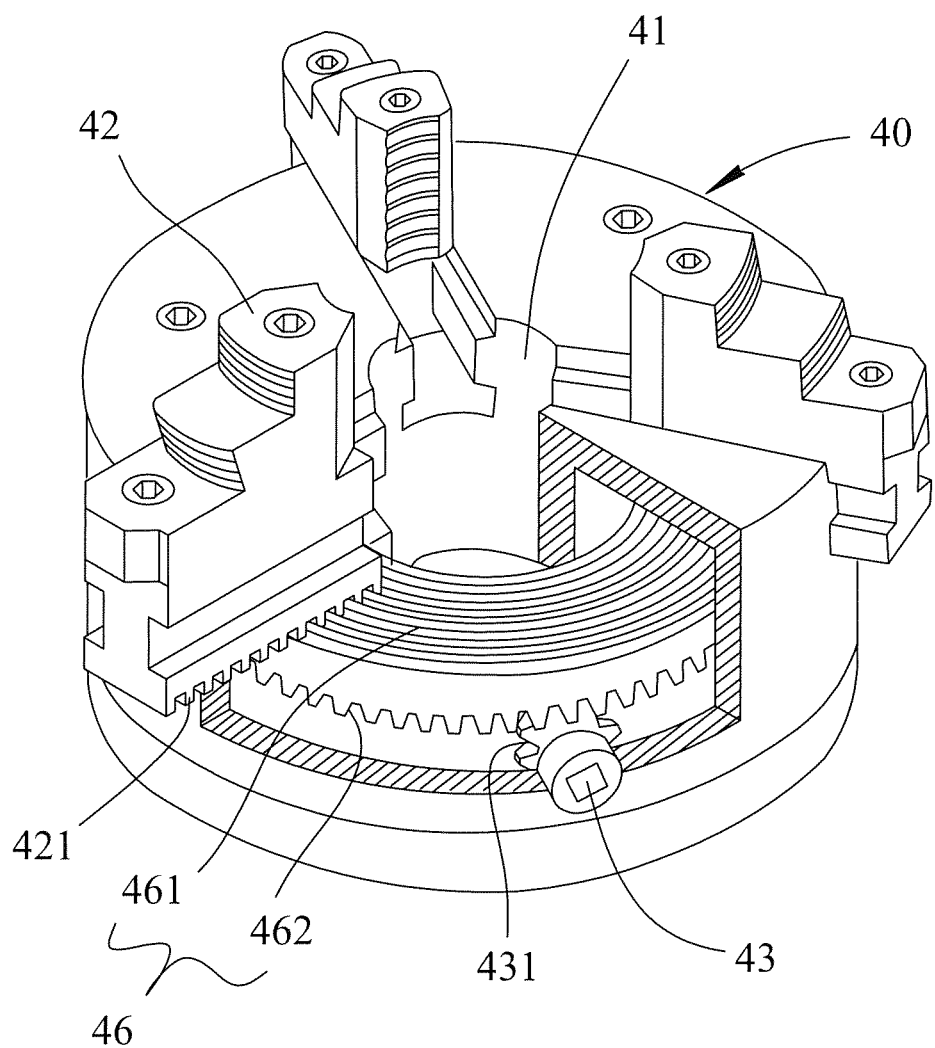
FIG. 6 is a perspective view of the rotary device of the chuck assembly of the present invention.

As shown in FIGS. 4 and 6, the chuck unit 40 is manufactured into different sizes and has a passage 41 and multiple adjustment members 43 located around the chuck unit 40. The chuck unit 40 has multiple connection holes 44. A disk 46 is rotatably located in the chuck unit 40 and has spiral teeth 461 defied in a first surface thereof, and multiple teeth 462 are defined in a second surface of the disk 46. Each adjustment member 43 has a bevel gear 431 which is engaged with the teeth 462 of the disk so as to rotate the disk 46. The spiral teeth 461 are engaged with the toothed portion 421 of the pawls 42 of the chuck unit 40 such that the disk 46 drives the pawls 42 to be simultaneously moved relative to the center of the chuck unit 40.

Figure 2:
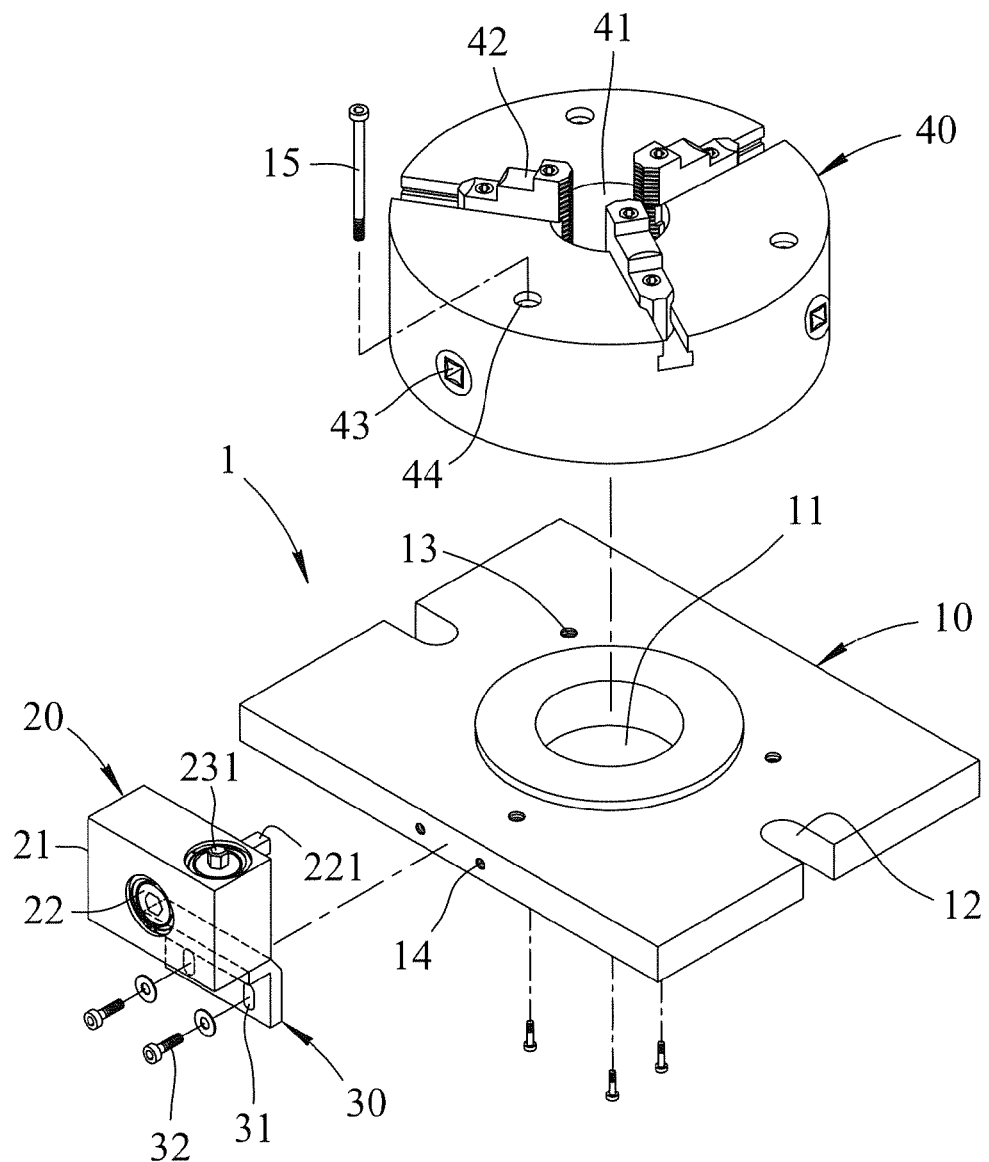
FIG. 2 is an exploded view of the chuck assembly of the present invention.
Figure 7:
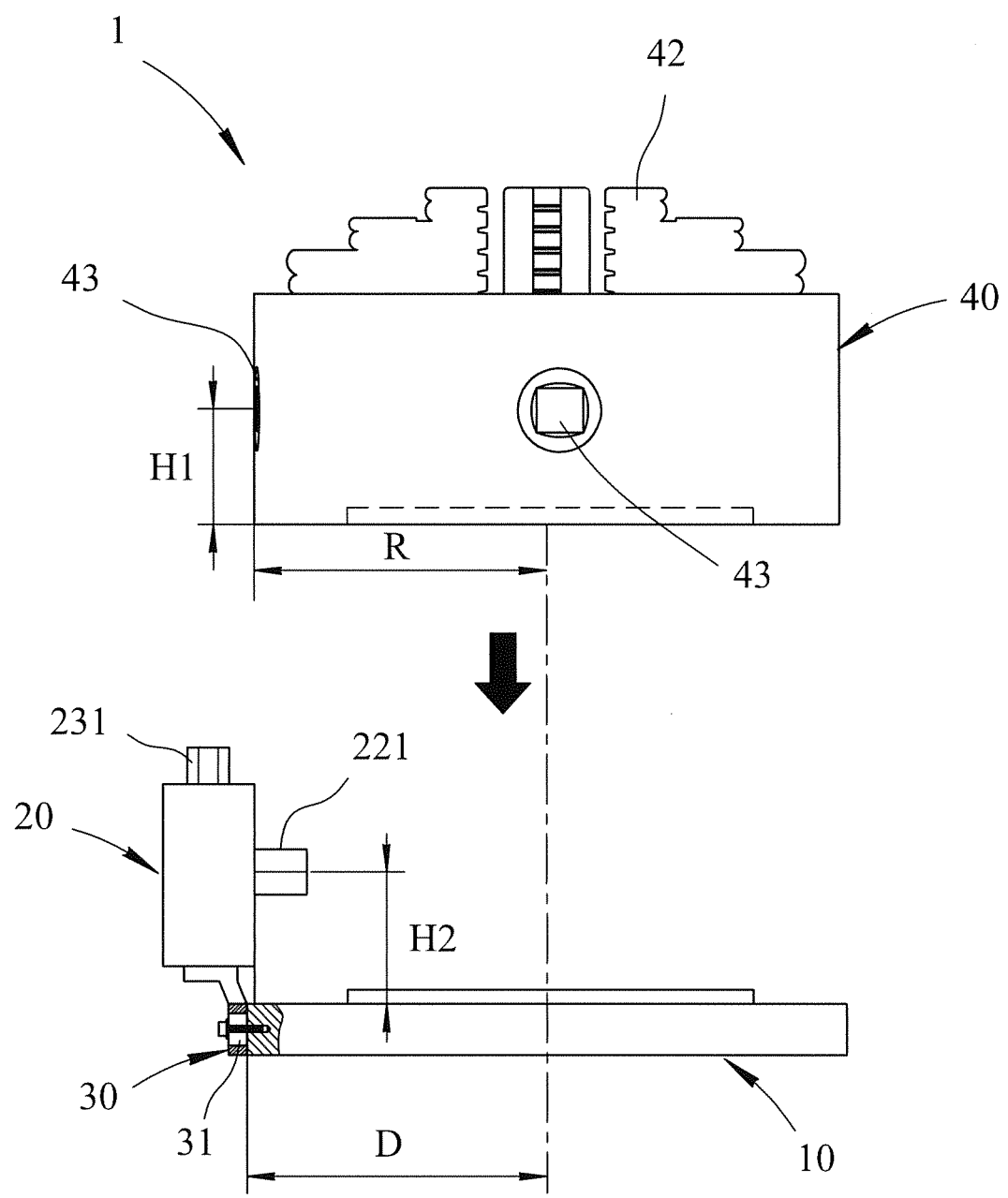
FIG. 7 shows the relative positions between the height H1 of the chuck device and the height H2 of the rotary device, and between the distance D and the distance R of the chuck device.
Figure 8:
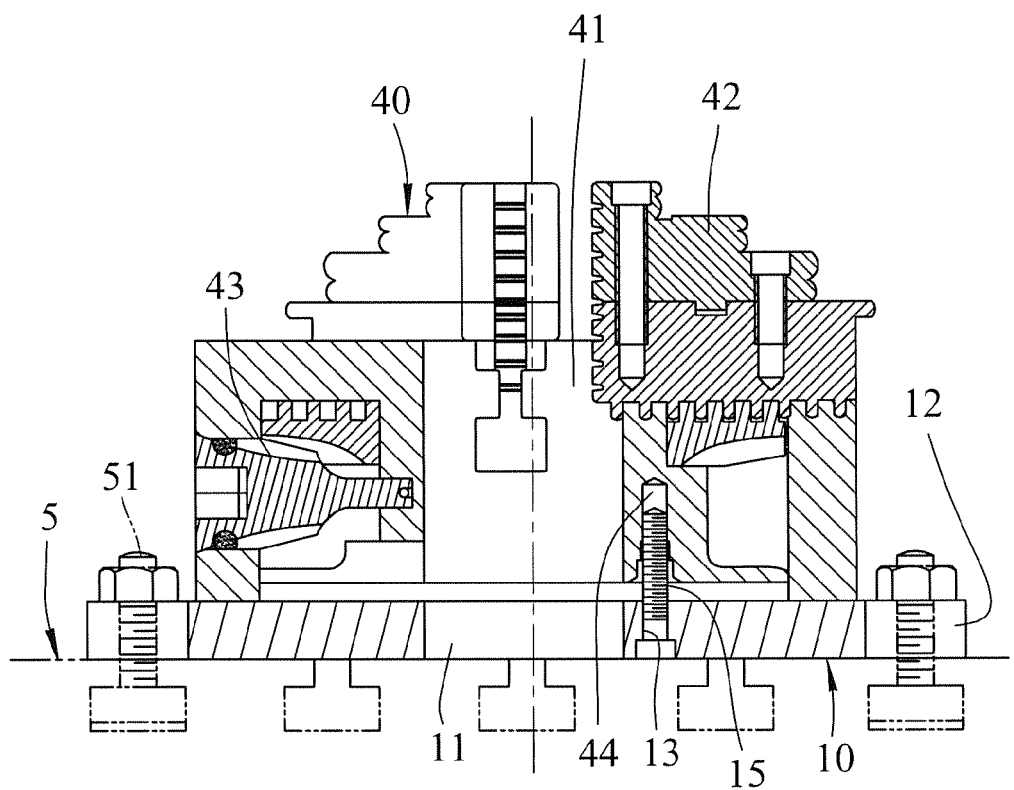
FIG. 8 is a cross sectional view to show that the chuck assembly of the present invention is installed to a work bench.

As shown in FIGS. 2, 7 and 8, the chuck unit 40 is installed to the base 10 and the connection holes 44 of the chuck unit 40 are located in alignment with the first holes 13, the bolts 15 extend through the connection holes 44 of the chuck unit 40 and are connected to the first holes 13 to fix the chuck unit 40 to the base 10. The insertion 221 of the horizontal gear set 22 is inserted into one of the adjustment members 43 of the chuck unit 40, and the bolts 32 extend through the through holes 31 to fix the extension 30 to the first holes 13 of the base 10.

As shown in FIG. 7, the chuck unit 40 is a standard product which can be made into different sizes and specifications so that the chuck unit 40 may have different height. The height H1 of the adjustment members 43 of the chuck unit 40 is equal to the height H2 of the horizontal gear set 22 of the rotary device 20. The distance D from the center of the base 10 to the rotary device 20 is cooperated with the radius R of the chuck unit 40 so that when the rotary device 20 is installed to the base 10, the insertion 221 is able to be inserted into the adjustment members 43. In order to allow the chuck assembly 1 of the present invention to be cooperated with the different heights H1 of the adjustment members 43 of the products of different brands, the through holes 31 are oval holes so that the height H2 can be adjusted when needed.

Figure 9:
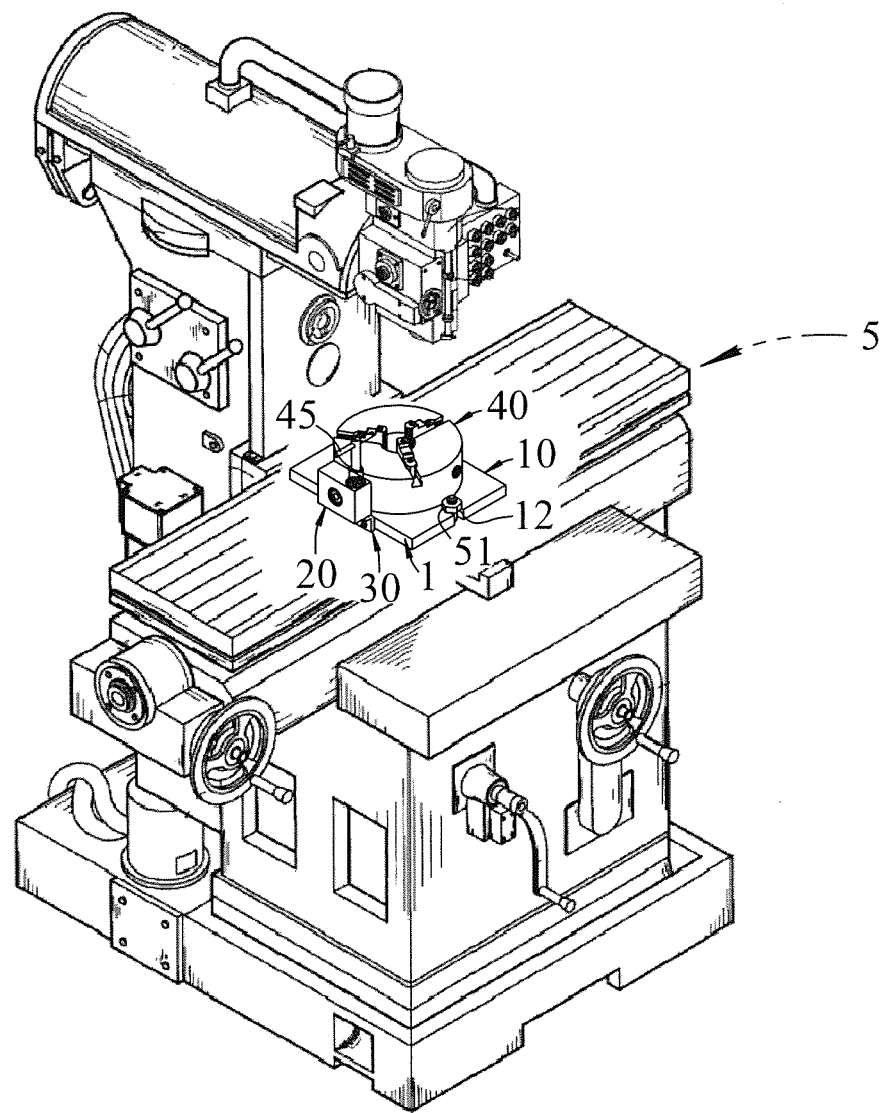
FIG. 9 is a perspective view to show that the chuck assembly of the present invention is installed to a vertical machine center.
Figure 10:
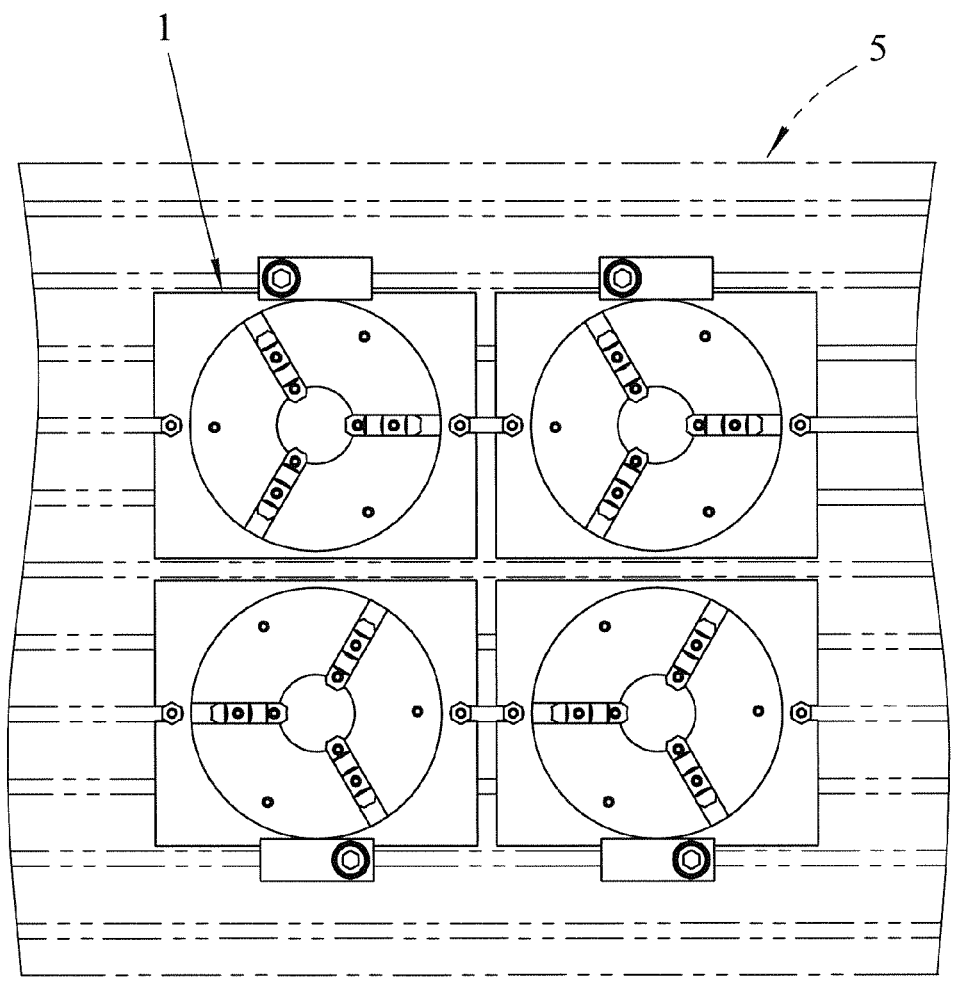
FIG. 10 shows that multiple chuck assemblies of the present invention are installed to a work bench.
Figure 11:
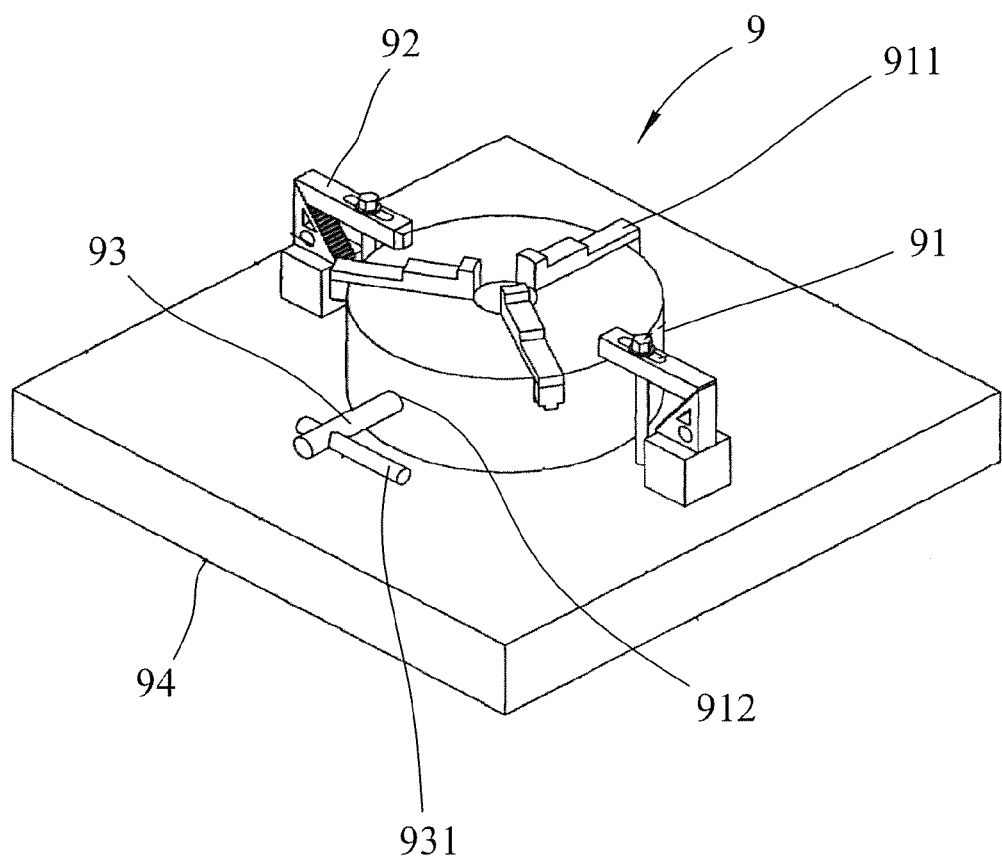
FIG. 11 shows a conventional chuck assembly.

As shown in FIG. 9, when in use, the chuck assembly 1 is installed to a work bench 5 and operated in vertical direction. The fixing bolts 51 are used to extend through the two elongate notches 12 to fix the chuck assembly 1 to the work bench 5. The T-wrench 45 is mounted to the connection portion 231 of the vertical gear set 23 to control the pawls 42 to clamp the object or not. The operation of the T-wrench 45 does not interfere the work bench 5. As shown in FIG. 10, multiple chuck assemblies 1 of the present invention can be installed to the work bench 5 to increase the efficiency of work.

While we have shown and described the embodiment in accordance with the present invention, it should be clear to those skilled in the art that further embodiments may be made without departing from the scope of the present invention.

What is claimed is:

1. An upright chuck assembly comprising:
    a chuck unit having a passage and multiple adjustment members, the chuck unit having multiple connection holes;
    a base having a central hole, two elongate notches respectively defined in two sides of the base, multiple first holes defined in the base and located beside the central hole, multiple bolts extending through the first holes to connect the base to the chuck unit, and
    a rotary device having a body, a horizontal gear set and a vertical gear set, the horizontal gear set and the vertical gear set being engaged with each other in the body, an insertion extending from the horizontal gear set and inserted into one of the adjustable members to connect the horizontal gear set to the base, the vertical gear set having a connection portion on a top thereof, a T-wrench being mounted to the connection portion;
    wherein the rotary device has an extension extending therefrom and the extension is connected to second holes defined in one side of the base by extending multiple bolts through through-holes in the extension, the through-holes each are oval holes and the bolts are adjustable in the through-holes.

2. The upright chuck assembly as claimed in claim 1, wherein the insertion of the horizontal gear set is a rectangular rod, a pentagonal rod or a hexagonal rod.

3. The upright chuck assembly as claimed in claim 1, wherein the connection portion of the vertical gear set is a rectangular hole, a pentagonal hole or a hexagonal hole, or a rectangular rod, a pentagonal rod or a hexagonal rod.

* * * * *